July 23, 1957  J. W. KOWALCZYK  2,800,630
REACTOR FOR MEASURING DIRECT CURRENTS
Filed Nov. 28, 1952
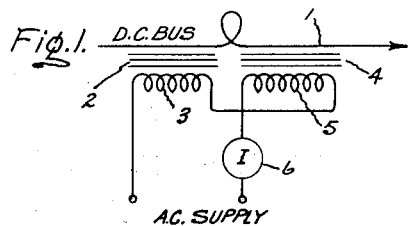
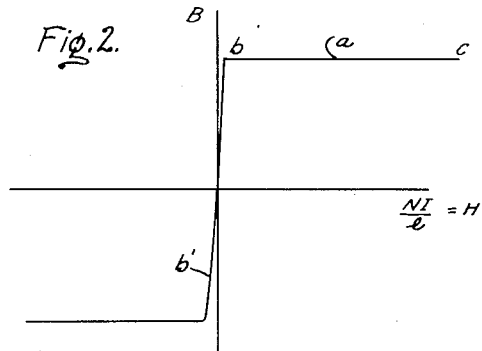
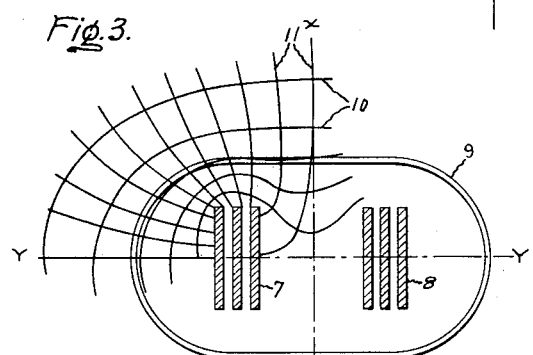
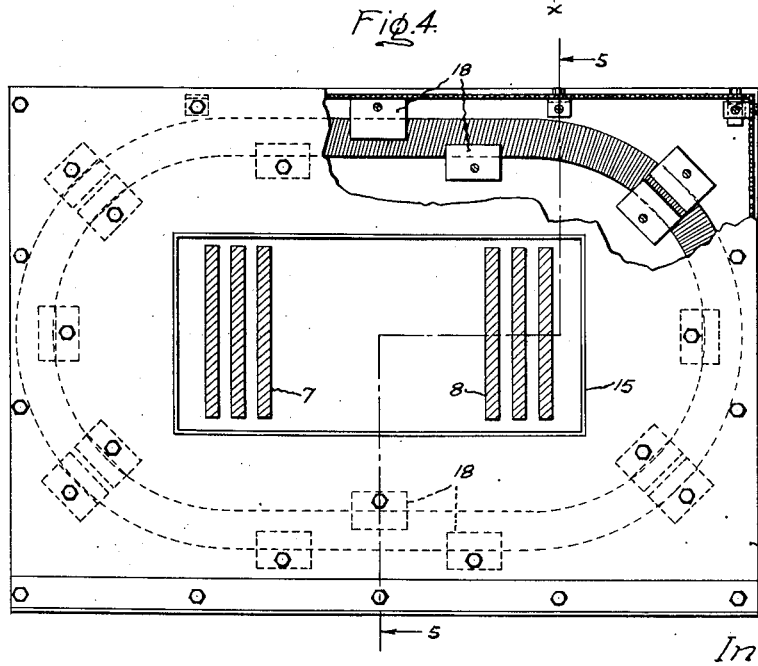
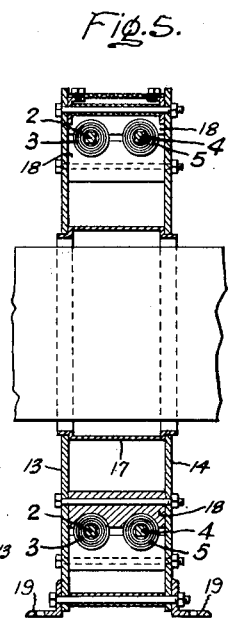
Inventor:
Joseph W. Kowalczyk,
by Paul A. Frank
His Attorney.

United States Patent Office 2,800,630
Patented July 23, 1957

2,800,630

REACTOR FOR MEASURING DIRECT CURRENTS

Joseph W. Kowalczyk, Schenectady, N. Y., assignor to General Electric Company, a corporation of New York Application November 28, 1952, Serial No. 323,053

7 Claims. (Cl. 324—127)

This invention relates to reactors for measuring values of direct current.

A direct current measuring reactor is a device having one or more saturable component reactors to control the current in an alternating current secondary circuit according to the magnitude of a direct current in a magnetically coupled primary circuit. The measuring reactor corresponds to a transformer since the primary current controls the secondary current, although, since direct current power cannot be transferred across a magnetic circuit, a separate alternating current secondary supply is required. An effective one-turn primary winding is obtained without actually forming a turn by providing a continuous reactor core around a straight bus section, the secondary turns being wound around the core to provide the desired coupling. Such reactors are thus especially desirable for measuring very high currents, such as is in the order of tens of thousands of amperes and higher, since the high current bus need not be especially formed or interrupted for insertion of a shunt or other device.

In the operation of such devices, the reactor core is saturated by the primary magnetic flux and the alternating secondary current required to desaturate the core affords a measure of the primary current amplitude. However, if the primary magnetizing force is not equally distributed along each unit length of the core, all parts of the core may not be equally demagnetized by the secondary current and the reactor characteristics may be seriously impaired so far as accuracy, linearity, or regulation are concerned. This undesired effect is usually encountered where very high currents are involved because the core shape and the magnetic field in the core established by the primary current for convenience and economy both usually depart from a circular pattern. Thus, a high current bus constituting a primary winding may have a rectangular cross section or it may comprise a number of spaced component conductors so that the primary magnetic field departs substantially from a circular pattern in regions near the bus. The reactor core, on the other hand, is generally limited in size for economy of manufacture and installation to an opening or window not much larger than the bus cross section. The effects of external fields and magnetic objects are also thus minimized. For these reasons it is not generally feasible to shape the core to correspond to the primary field configuration.

It is, therefore, an object of my invention to provide a direct current measuring reactor for accurately measuring direct current carried by non-circular cross-section buses or conductors.

It is a further object of my invention to provide a direct current measuring reactor for applications where the shape of a reactor core is non-circular.

It is still a further object of my invention to provide a practical means for improving the characteristics of D.-C. current measuring reactors.

It is another object of my invention to provide a means for preventing local saturation in portions of the core of a reactor used for measuring very high direct currents when the size and shape of the primary conductor is known.

Briefly, according to my invention, in a direct current measuring reactor having a core shape departing substantially from the cross section outline of the bus which it surrounds, the turns on a secondary core winding are distributed along the core to vary with the magnetizing force therein produced by the direct current. Equal numbers of coil turns are thus provided for increments of core length corresponding to equal divisions of the primary magnetomotive force around the core. In this way the secondary demagnetizing ampere turns can equal the primary magnetizing turns without encountering the undesirable effects of local core saturation.

The novel features which are considered to be characteristic of my invention are set forth with particularity in the appended claims. My invention itself, however, both as to its organization and method of operation, together with further objects and advantages thereof, may best be understood by reference to the following description taken in connection with the accompanying drawing wherein:

Fig. 1 is an elementary diagram illustrating a type of direct current measuring reactor which may profitably embody my invention;

Fig. 2 is a magnetization curve of a reactor which is included to help explain the operation of reactors embodying my invention;

Fig. 3 is a cross section of a direct current bus showing a magnetic field plot and the position of a reactor core with respect to the bus;

Fig. 4 is a front view, partly in section of a measuring reactor incorporating my invention; and Fig. 5 is a cross-sectional view along line 5—5 of Fig. 4.

Before proceeding to a description of the invention itself, a brief consideration of the nature of operation of current measuring reactors generally is believed helpful for understanding the significance of the improvement represented by the invention.

The elementary diagram of a direct current measuring reactor device having two component reactors is shown in Fig. 1, where a direct current bus 1 is a primary winding having a first core 2 with a secondary winding 3 and a second core 4 with a secondary winding 5. In practice, the cores 2 and 4 each surround the direct current bus 1 so that it has in effect a single turn whereas the secondary windings 3 and 5 each have a large number of turns. The reactor windings 3 and 5 are connected in series opposition and thence to an alternating current source through an alternating current ammeter 6. With such an arrangement at any given time the alternating current magnetomotive force in one core adds to the magnetomotive force produced by the D.-C. primary bus while the alternating current magnetomotive force in the second core subtracts from that produced by the direct current.

In order that the secondary alternating current can vary linearly with the primary current, the component cores of the reactor, i. e., the cores 2 and 4, are made of a magnetic material having a substantially rectangular B—H or magnetization curve. Fig. 2 shows a curve for one of the cores in which negligible magnetizing current is required to reach saturation and after saturation an increase in current causes practically no increase in flux density. Considering the impedance of the reactor as proportional to the slop of the curve, the impedance of the reactors approaches zero during saturation and approaches infinity while unsaturated. Values of primary current in the range to be measured are sufficient to saturate both cores, and the alternating secondary current is limited at a given moment only by the high impedance of the component reactor in which the alternating current ampere turns desaturate that reactor core.

The operation of the measuring reactor may therefore be considered in terms of what happens during one alternating cycle of either one of the component reactors. Thus, point "a" on the magnetization curve for one of the reactors may be assumed to correspond to the primary current value at this instant. Assuming the applied alternating current voltage is initially applied to the secondary winding at a time when the voltage is at a positive maximum, the alternating current rises abruptly to a value required to substantially desaturate the core. This value depends upon the fact that the primary ampere turns must equal the secondary ampere turns and corresponds to point "b" on the curve, which is the knee of the curve. Any further substantial increase in the secondary current is prevented by the high impedance represented by the substantially vertical part of the curve. However, the change of flux linkages induces a voltage which counteracts the applied voltage, with only a very small increase in current to point "b'," being necessary to produce the flux variation which induces the back voltage. The current thus remains constant until the reactor flux returns to the saturated value "b." During the next half cycle the secondary current adds to the primary ampere turns, then attaining a value corresponding to point "c" on the magnetization curve. This value is determined by the current limiting action of the second component reactor corresponding to that already described.

In a current measuring reactor operating as described, the secondary current approaches a rectangular wave form. This represents the ideal so far as accuracy and linearity, as well as other desired characteristics, are concerned. The core material is vitally important in this respect and must have as nearly a rectangular B—H or magnetization curve as possible. The core must be carefully formed and supported, and for various reasons it is desirable that the core have a relatively simple shape without any sharp bends or unusual configuration.

It can be graphically shown, however, that when the bus comprising the primary side of the measuring reactor has a rectangular or other configuration departing substantially from a circular cross section and the reactor was designed to provide the usual uniform secondary ampere turns per unit core length, the linearity and regulation are poor and the quality theoretically attainable with the grade of core material available, is not realized. The deficiency is particularly acute in high current installations for measuring tens of thousands or hundreds of thousands amperes where the direct current buses are large and irregular in outline so far as departure from a circular cross section outline is concerned. Usually the high current bus bars are rectilinear in cross section, resulting in relatively sharp corners in the bus section.

The analysis and practical solution of the problem are indicated in Fig. 3. This figure illustrates the cross section of a direct current bus comprising two groups of spaced rectangular conductors 7 and 8 connected in parallel which carry the total current. A reactor core 9 having an oval or elliptical shape and a uniform cross section area represents a conveniently obtainable core shape. Orthogonal axes of symmetry X—X and Y—Y divide the cross section plane into identical quadrants, and a magnetic field plot is shown for one of them. The magnetic field plot is constructed to show the distribution of the primary current magnetomotive force or ampere turns. For this purpose it is usually convenient to first construct flux lines 10 which surround the bus and indicate the magnetic field direction. Then lines of constant magnetomotive force or magnetic equipotential lines 11 radiating from the conductors are constructed. These lines 11 are spaced to represent equal increments of magnetomotive force from line to line. Such field plots may be constructed by various methods well known in the art. Since the magnetic field plots are analogous to electric field plots in many respects, apparatus adapted for electric field plotting may also be employed. The plot is not materially altered by the presence of the magnetic core 9 since the core permeability is very low when saturated.

Referring still to Fig. 3, it may be seen that the lengths of the core 9 between adjacent magnetic equipotential lines 11 vary. This means that the primary or magnetizing ampere turns changes along the length of the core. This would not be the case if the core shape and the bus cross section were circular and concentric, or if the core shape were distorted to follow a path of constant H or magnetic field intensity, but such arrangements may be impractical for various reasons. Accordingly, since the current through the turns of a conventionally uniformly wound secondary coil wound around the whole or partial core length is the same at all points, the secondary or desaturating ampere turns are not equal to the primary or magnetizing ampere turns in each unit length of a conventionally wound core. Local core saturation results and the secondary current is controlled by the degree of local saturation as well as by the magnitude of the primary bus current. The secondary current in such a case does not vary linearly with the primary current, and the calibration is rendered difficult by the fact that the deviation is substantial and not readily predictable. Such local core saturation violates the fundamental requirement for operation of the current measuring resistor, namely, that the secondary ampere turns depend entirely upon the primary ampere turns, and is generally detrimental to desired measuring reactor characteristics.

In accordance with my invention the turns of the secondary winding of a component reactor are distributed so that the secondary ampere turns per unit length of the core matches the primary ampere turns per unit length. Still referring to Fig. 3 the primary ampere turns in different lengths of the core are inversely proportional to the length of the core between adjacent constant magnetomotive force lines 11 intersecting the core. The accuracy of measurement is increased by detailing the field plot to provide a large number of such lines. Assuming for example that the bus conductors 7 and 8 carry 40,000 amperes, the primary ampere turns along the core length in one quadrant are 10,000 ampere turns. With one line 11 of constant magnetomotive force every thousand ampere turns and assuming a secondary current of one ampere, one thousand secondary turns are wound on each length of core intersected by adjacent lines 11. Thus, the secondary ampere turns in each unit length match and are proportional to the primary ampere turns and bus current magnetomotive force in that length. The turns per unit length is thus varied in ten steps per quadrant, and, of course, a finer gradation may be employed.

To some extent the detrimental effects of uneven or local core saturation can be reduced by winding several coils on one core and connecting them in parallel. In each such branch winding the primary and secondary ampere turns will cancel over the core length involved wth the particular winding. However, there is a practical limit to the number of parallel windings per core, especially when a continuous core is employed. In most large rating applications, each core has several parallel coils but each of these coils is wound in accordance with the flux plot. Thus, even though parallel windings are used, the turns of each coil are distributed so that the secondary ampere turns per unit length match the primary ampere turns per unit length.

Figs. 4 and 5 illustrate a typical measuring reactor for high currents which advantageously incorporates my invention. Here the high direct current bus conductors 7 and 8 comprise a single turn primary winding corresponding to the primary winding 1 in the elementary diagram of Fig. 1. The two cores 2 and 4, each with their respective distributed secondary windings 3 and 5 are generally elliptical in outline and are centered relative to the bus assembly. Each core is preferably wound from a continuous strip of high quality magnetic material, the core being preferably formed as a spiral with a sufficient number of core windings or laminations to meet the design requirements. The magnetization curve of the core material, since it is subject to deviation from the optimum realizable rectangular shape due to strain, must be carefully wound and not subject to sharp bends. Either generally elliptical or circular core shapes have been found satisfactory for high quality measuring reactors.

Since the cores 2 and 4 must also be firmly supported so that they do not change their shape or position with respect to the primary winding, they are positioned between two rigid plates 13 and 14, the plates being made of laminated plastic or other suitable non-magnetic material. Each of the supporting plates of the frame has an opening or window 15 to permit the reactor assembly to be slipped over an end of the primary bus when the primary circuit is opened for installation of the reactor. These windows 15 are aligned with each other and a mounting shell or support spacer 17 also suitably made of brass is positioned between them. The cores 2 and 4 with their secondary windings distributed per unit length in accordance with the field distribution as determined by a flux plot of Fig. 3 are positioned side by side around the window opening in the frame. The cores and their coils are clamped in place between a number of pairs of space blocks 18 which are bolted between the frame plates 13 and 14 at a number of points along the length of the core. The entire assembly is itself rigidly supported to hold the plane of the cores perpendicular to the primary bus, brackets 19 being bolted to the frame to provide means for mounting the measuring reactor to a wall or supporting frame.

The number of turns in the secondary coils are, of course, dependent upon the particular design specifications of any given reactor but in general the secondary turns are very large in number so that a very low voltage is induced in the primary due to transformer action. The resulting alternating currents on the primary side of the measuring reactor are thus very small relative to the direct current magnitude. Since the number of secondary turns is so large a multi-layer winding is required, and no attempt has been made in the drawing of Fig. 4 to show the varying number of turns per unit length along each core. It is to be understood that this variation follows that indicated and explained in Fig. 3.

It will be understood, of course, that various primary bus shapes are encountered which require special distribution of the secondary windings in order to compensate for the varying degrees of primary magnetizing force to which the saturated reactor cores are subject along their length. These conductors are for the most part rectangular in cross section as is the usual practice in bus or bus bar arrangements. In many cases a number of conductors or bus bars carrying current in parallel carry the total current to be measured. In all such cases, of course, the magnetic field pattern will be irregular and the practice of my invention is particularly profitable.

While the present invention has been described by reference to a particular embodiment thereof, it will be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. A reactor for measuring the amplitude of current in a direct current bus comprising a core of magnetic material for surrounding said bus and adapted to be saturated by the magnetic flux associated with the bus current, the outline of the bus cross section differing substantially from the core shape whereby the magnetomotive force produced by the bus current varies along the length of the core, a multi-turn secondary coil wound around at least a portion of the length of said core, the turns being distributed per unit length to correspond with the bus current magnetomotive force per unit core length, and means for supplying a current through said secondary coil to produce a countermagnetomotive force for desaturating the core, the amplitude of the desaturating current providing a measure of the bus current.

2. A reactor for measuring the amplitude of direct current in a high current D. C. bus having a cross section outline including a rectilinear portion, said reactor comprising a core of magnetic material for surrounding a section of said bus and adapted to be saturated by the magnetomotive force produced by current in said bus, a multi-turn coil wound about at least a portion of the length of said core, means for supplying current in said coils to provide a countermagnetomotive force for desaturating the core, and means for measuring the amplitude of the coil current to provide a measure of the current in said bus, the turns of said coil being spaced to provide an ampere turn distribution per unit length of core which matches the ampere turn distribution per unit length produced by the bus current.

3. A reactor for measuring the amplitude of direct current in a high current bus having a rectilinear cross section outline comprising a core of magnetic material arranged to be positioned around such a bus, said core having a smoothly curved outline, and a multi-turn core winding comprising one or more coils distributed along a length of said core, the turns of said winding being spaced to provide a turn distribution per unit length which corresponds to the magnitude of the magnetomotive force per unit length produced by current in said bus.

4. A reactor for measuring the amplitude of direct current in a high current bus cross section outline comprising a core of magnetic material arranged to be positioned around such a bus and having a multi-turn winding distributed around a length of said core, said core having a shape differing substantially from the cross section outline of said bus whereby the magnetomotive force in said core produced by the bus current varies locally along said length, the turns of said winding being spaced to provide a turn distribution coeresponding to the local magnitude of said magnetomotive force.

5. A reactor for measuring the amplitude of direct current in a high current bus comprising a core of magnetic material for surrounding said bus and adapted to be saturated by the magnetic flux associated with the bus current, the outline of the bus cross section differing substantially from the core shape whereby increments of different core lengths correspond to equal increments of magnetomotive force produced in the core by the bus current, and a coil wound around at least a portion of the core length, the turns of said coil being distributed with an equal number of turns on each of said increments of different core length included in said portion of the core length.

6. A reactor for measuring the amplitude of current in a direct current bus comprising a core of magnetic material for surrounding said bus and adapted to be saturated by the magnetic flux associated with the bus current, the outline of the bus cross section differing substantially from the core shape whereby increments of different core lengths correspond to equal increments of magnetomotive force produced in the core by the bus current, a secondary coil wound around at least a portion of the core length, the turns of said coil being distributed with an equal number of turns on each of said increments of different core length included in said portion of the core length, and means for supplying a current through said secondary coils to produce a countermagnetomotive force for desaturating the core, the amplitude of the desaturating current providing a measure of the bus current.

7. A reactor for measuring the amplitude of direct current in a direct current bus having a plurality of spaced component conductors for carrying a total current whose amplitude is to be measured, said reactor comprising a curved core of magnetic material for surrounding said bus and adapted to be saturated by the magnetic flux associated with the bus current, the magnetomotive force in the core produced by the bus current varying locally along the length of the core, a multi-turn secondary coil wound around at least a portion of the length of said core, the turns being distributed along the length to correspond with the local bus current magnetomotive force in the core, and means for supplying a current through said secondary coil to produce a countermagnetomotive force for desaturating the core, the amplitude of the desaturating current providing a measure of the bus current.

References Cited in the file of this patent

UNITED STATES PATENTS

| | | |
|---|---|---|
| 2,382,199 | Brink | Aug. 14, 1945 |
| 2,415,985 | Bechberger et al. | Feb. 18, 1947 |
| 2,452,901 | Camilli | Nov. 2, 1948 |
| 2,527,881 | Hartmann | Oct. 30, 1951 |

FOREIGN PATENTS

| | | |
|---|---|---|
| 829,522 | France | June 29, 1938 |